(12) United States Patent
Salamon et al.

(10) Patent No.: US 12,554,580 B2
(45) Date of Patent: Feb. 17, 2026

(54) I/O MANAGEMENT IN A DISTRIBUTED STORAGE SYSTEM

(71) Applicant: Dell Products L.P., Round Rock, TX (US)

(72) Inventors: Victor Salamon, Edmonton (CA); Paul A. Shelley, Edmonton (CA)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/794,097

(22) Filed: Aug. 5, 2024

(65) Prior Publication Data

US 2026/0037380 A1 Feb. 5, 2026

(51) Int. Cl.
*G06F 11/10* (2006.01)
*G06F 11/07* (2006.01)
*G06F 11/20* (2006.01)

(52) U.S. Cl.
CPC ...... *G06F 11/1092* (2013.01); *G06F 11/0772* (2013.01); *G06F 11/2023* (2013.01)

(58) Field of Classification Search
CPC ............. G06F 11/0793; G06F 11/1088; G06F 11/1092; G06F 11/1423; G06F 11/1425; G06F 11/20; G06F 11/201; G06F 11/2007; G06F 11/2023; G06F 11/2053; G06F 11/2064; G06F 11/2097
See application file for complete search history.

(56) References Cited

U.S. PATENT DOCUMENTS

| | | | |
|---|---|---|---|
| 9,015,518 B1* | 4/2015 | Wenzel | G06F 11/1479 714/4.1 |
| 2003/0188229 A1* | 10/2003 | Lubbers | G06F 11/2064 714/47.2 |
| 2014/0229694 A1* | 8/2014 | Clayton | G06F 3/0604 711/162 |
| 2016/0292250 A1* | 10/2016 | Chen | G06F 16/273 |

* cited by examiner

*Primary Examiner* — Michael Maskulinski
(74) *Attorney, Agent, or Firm* — DALY, CROWLEY, MOFFORD & DURKEE LLP

(57) ABSTRACT

Systems and methods for allowing and maintaining Input/Output (I/O) operations in a distributed storage system with multiple storage sites when communications links between the sites fail are provided. Mirrored storage sites use an update policy, including an update record and a bitmap configured to track changes in memory blocks storing an I/O request. When a link between two or more sites fails, one or more of the sites may be designated as a primary site, on which normal I/O operations may continue. One or more sites may also be designated as non-primary sites and are "detached" with respect to the primary site or sites. I/O operations on the non-primary sites may be suspended until the link is restored. When the link is restored, the update records and bitmaps are used to rebuild the detached sites.

20 Claims, 9 Drawing Sheets

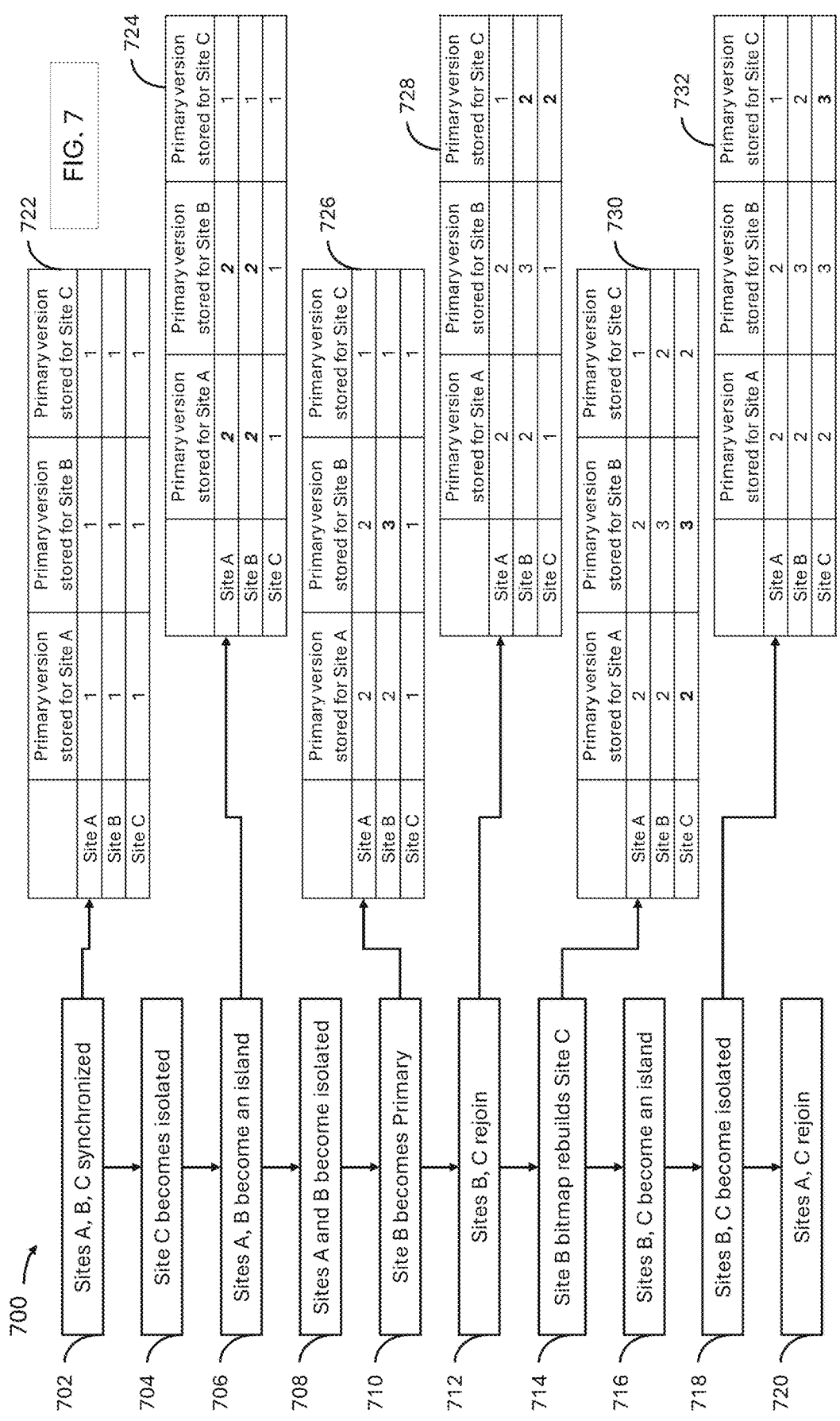

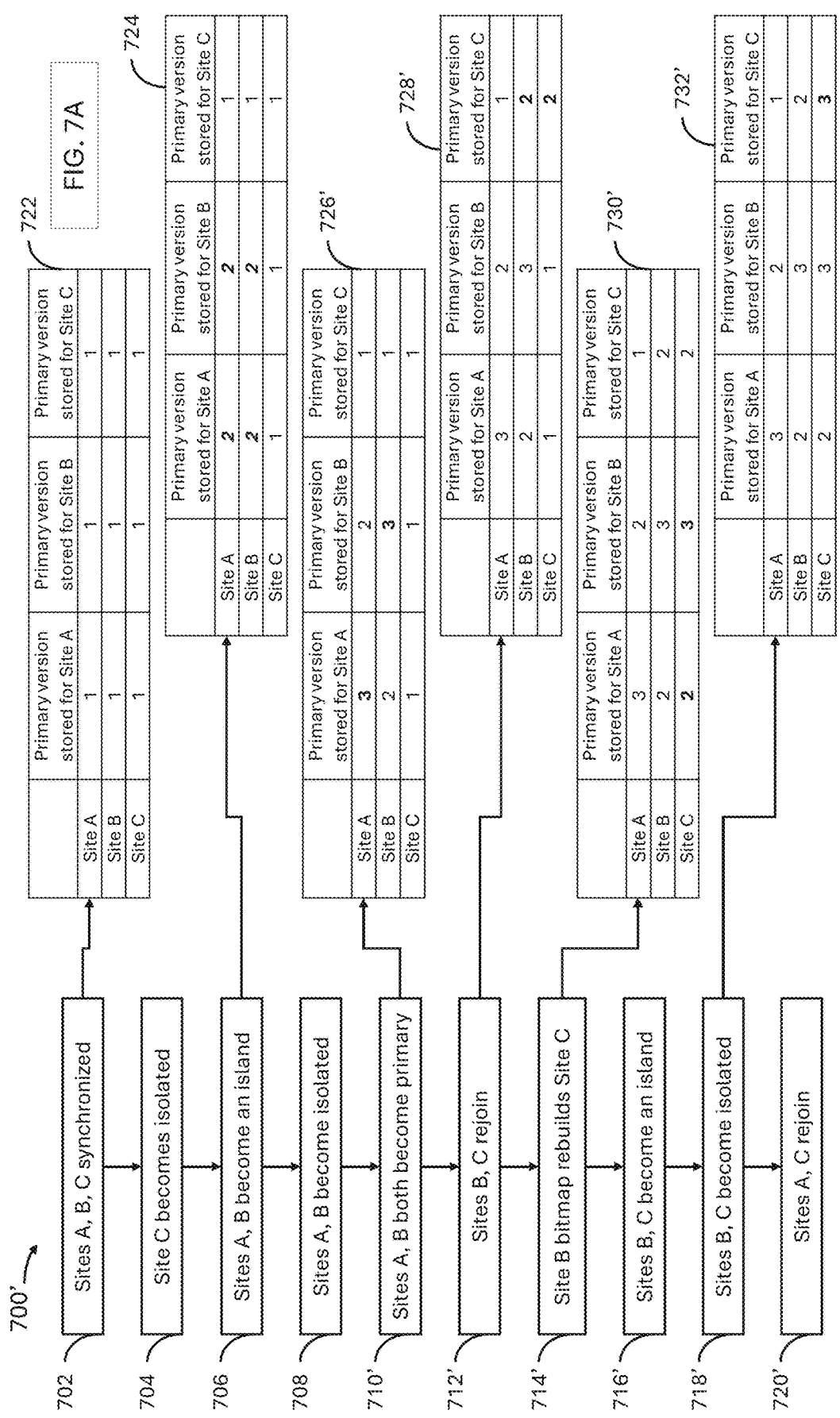

I/O MANAGEMENT IN A DISTRIBUTED STORAGE SYSTEM

BACKGROUND

In storage systems distributed across multiple sites, virtual volumes may be used whose memory blocks are equally accessible from multiple sites. In such systems, all sites are allowed to concurrently do Input/Output (I/O) operations to the same blocks of the virtual volume. Coordination is necessary to ensure each block is coherent and correct at all sites. When the network between sites is temporarily disconnected, this coordination is no longer possible. Consequently, I/O operations may be stopped, leading to downtime for hosts and negative impact to business operations.

Known solutions allow for resumption of I/O operations at one site following inter-site link outages and engage in coherence restoration when the links are repaired. These systems and solutions, however, are limited to two-site systems, or three-site systems with only one active site.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, a method may include providing a storage system having a plurality of linked and mirrored storage sites. The storage system may be configured to receive input/output (I/O) requests from a host. An update record may be provided for each of the plurality of storage sites. A failure may be detected in a link between at least two of the plurality of storage sites. At least one of the plurality of storage sites may be designated as a primary site. A first I/O request may be received to the storage system and the first I/O request may be directed to the primary site. The update record may be updated on the primary site to reflect the I/O request and the plurality of storage sites may be rebuilt based on the update record upon restoration of the link.

The method may further include, alone or in combination, one or more of the following features. The I/O requests may be suspended to all non-primary sites. Each update record may include a site status indicator comprising one of a primary site indicator or a non-primary site indicator. Each update record may comprise a bitmap including a list of storage blocks and a write status indicator for each storage block. The write status indicator may include a binary value indicating whether a corresponding storage block has been changed. Rebuilding the plurality of storage sites may comprise updating storage blocks of the non-primary sites corresponding to a positive write status indicator in the bitmap of the primary site. A second I/O request may be forwarded to the primary site while rebuilding the plurality of storage sites. The primary site may be designated by at least one of: an automatic static rule, an automatic dynamic rule, or a manual designation. The primary site may comprise an island of sites undisturbed by the failure in the link. Each update record may comprise a separate bitmap relative to each of the plurality of storage sites. Each update record may further include a primary version indicator, the primary version indicator reflecting a number of times designated as a primary site. The primary version indicator may be augmented upon rebuilding with a primary site.

According to another aspect, a system may include a memory and at least one processor that is operatively coupled to the memory. The at least one processor may be configured to perform the operations of providing a storage system having a plurality of linked and mirrored storage sites. The storage system may be configured to receive input/output (I/O) requests from a host. An update record may be provided for each of the plurality of storage sites. A failure may be detected in a link between at least two of the plurality of storage sites. At least one of the plurality of storage sites may be designated as a primary site. A first I/O request may be received to the storage system and the first I/O request may be directed to the primary site. The update record may be updated on the primary site to reflect the I/O request and the plurality of storage sites may be rebuilt based on the update record upon restoration of the link.

The method may further include, alone or in combination, one or more of the following features. The I/O requests may be suspended to all non-primary sites. Each update record may include a site status indicator comprising one of a primary site indicator or a non-primary site indicator. Each update record may comprise a bitmap including a list of storage blocks and a write status indicator for each storage block. The write status indicator may include a binary value indicating whether a corresponding storage block has been changed. Rebuilding the plurality of storage sites may comprise updating storage blocks of the non-primary sites corresponding to a positive write status indicator in the bitmap of the primary site. A second I/O request may be forwarded to the primary site while rebuilding the plurality of storage sites. The primary site may comprise an island of sites undisturbed by the failure in the link. Each update record may comprise a separate bitmap relative to each of the plurality of storage sites. Each update record may further include a primary version indicator, the primary version indicator reflecting a number of times designated as a primary site. The primary version indicator may be augmented upon rebuilding with a primary site.

According to another aspect, a non-transitory computer-readable medium storing one or more processor-executable instructions is provided, which when executed by at least one processor cause the at least one processor to perform the operations of providing a storage system having a plurality of linked and mirrored storage sites. The storage system may be configured to receive input/output (I/O) requests from a host. An update record may be provided for each of the plurality of storage sites. A failure may be detected in a link between at least two of the plurality of storage sites. At least one of the plurality of storage sites may be designated as a primary site. A first I/O request may be received to the storage system and the first I/O request may be directed to the primary site. The update record may be updated on the primary site to reflect the I/O request and the plurality of storage sites may be rebuilt based on the update record upon restoration of the link.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 7 is a flow diagram of a distributed storage update operation, according to one or more aspects of the present disclosure;

FIG. 7A is a flow diagram of an alternative distributed storage update operation, according to one or more aspects of the present disclosure.

DETAILED DESCRIPTION

Aspects of the present disclosure provide systems and methods for allowing and maintaining Input/Output (I/O) operations in a distributed storage system with multiple storage sites when communications links between the sites fail. Mirrored storage sites may have or use an update policy, including an update record and a bitmap configured to track changes in memory blocks storing an I/O request. When a link between two or more sites fails, one or more of the sites may be designated as a primary site, on which normal I/O operations may continue. One or more sites may also be designated as non-primary sites and are "detached" with respect to the primary site or sites. I/O operations on the non-primary sites may be suspended until the link is restored.

According to one aspect, the update record and bitmap may track memory blocks on the sites that are changed during the continued I/O operations. When the link is restored, the sites may communicate to each other (e.g., between the primary sites and the non-primary sites) the memory blocks that changed while the link was down, and the sites may be synchronized back into mirrored states. In systems with several mirrored sites (e.g., three or more), each mirrored site may include a bitmap relative to every other site in the distributed system. Further, update records on each site may further include a primary version indicator, designating the number of times that site has become a primary site. As detailed herein, the use of the bitmaps and primary version indicators allow for the efficient and consistent operation and synchronization of multiple mirrored storage sites in I/O operations of a distributed storage system in the face of arbitrary link outages.

Figure 1:
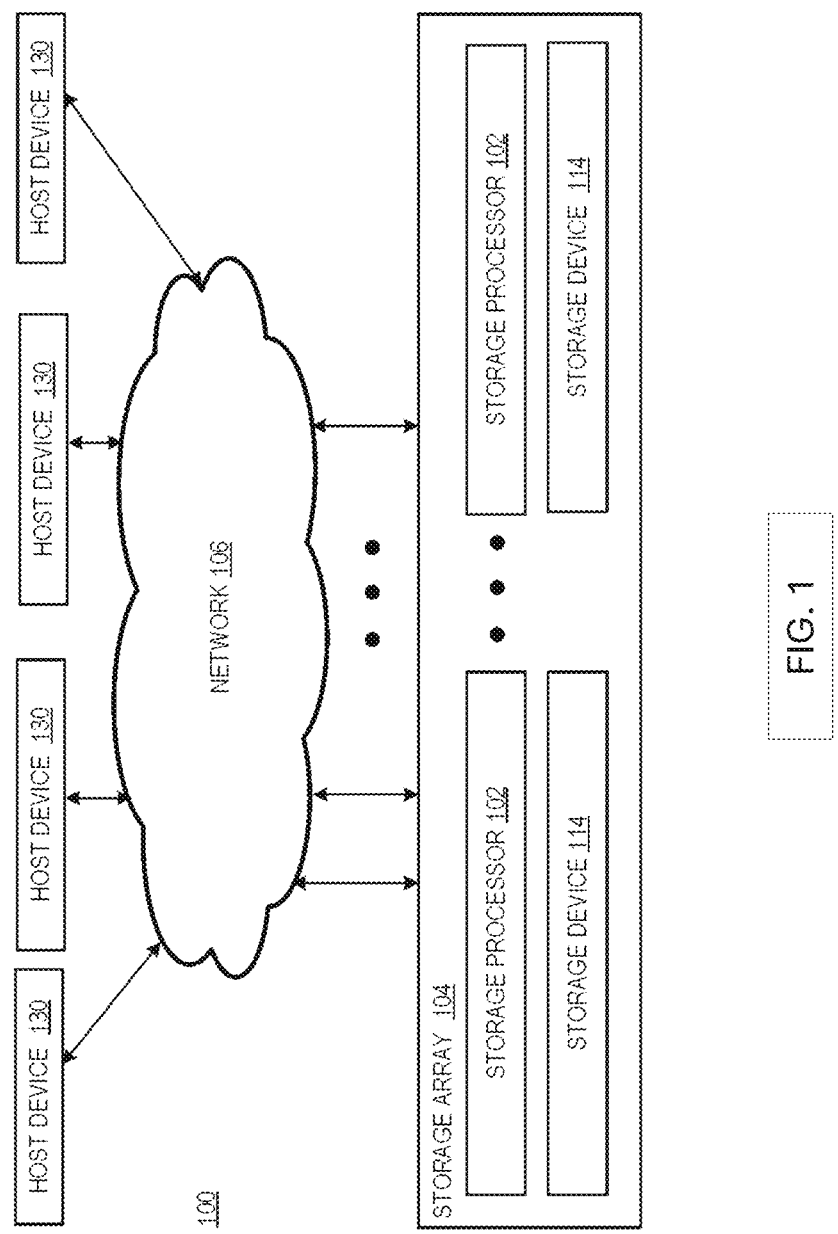
FIG. 1 is a diagram of an example of a storage system, according to one or more aspects of the present disclosure.

FIG. 1 is a diagram of an example of a storage system 100, according to aspects of the disclosure. As illustrated, the system 100 may include a storage array 104, a communications network 106, and a plurality of host devices 130. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include or be arranged with one or more site-pairs and a plurality of non-volatile memory storage devices 114. Each site may be or include, as described herein, a virtual provider. Each site of the site pairs may include one or more storage processors 102. Each of the storage processors 102 may be configured to receive I/O requests from host devices 130 and execute the received I/O requests by reading and/or writing data to storage devices 114. Each of the host devices 130 may include a desktop computer, a laptop, a smartphone, an internet-of-things (IoT) device, and/or any other suitable type of computing device.

According to one aspect, each of storage devices 114 may be a non-volatile memory express (NVMe) drive. In another aspect, the storage devices may be solid-state drives (SSD). In some implementations, each of the storage devices 114 may be connected to the storage processors 102 via a Peripheral Component Interconnect Express (PCIe) connection. Each of the storage devices 114 may include a respective controller (not shown) and storage medium (not shown). The controller of each storage device 114 may include processing circuitry that is configured to perform various tasks, such as the retrieval and storage of data on the medium, wear leveling, error handling, garbage collection, as well as other functions. The medium may include an array of NAND memory cells and/or any other suitable type of storage medium.

In some implementations, any of the storage devices 114 may be internal to one of the storage processors 102 and coupled to the storage processor via an M.2 slot that is provided on the motherboard of that storage processor. Additionally, or alternatively, in some implementations, any of the storage devices 114 may be part of a disk array enclosure (DAE) and coupled to each of the storage processors 102 via a respective InfiniBand adapter of that storage processor. It will be understood that the present disclosure is not limited to any specific method for connecting storage devices 114 to storage processors 102.

Figure 2:
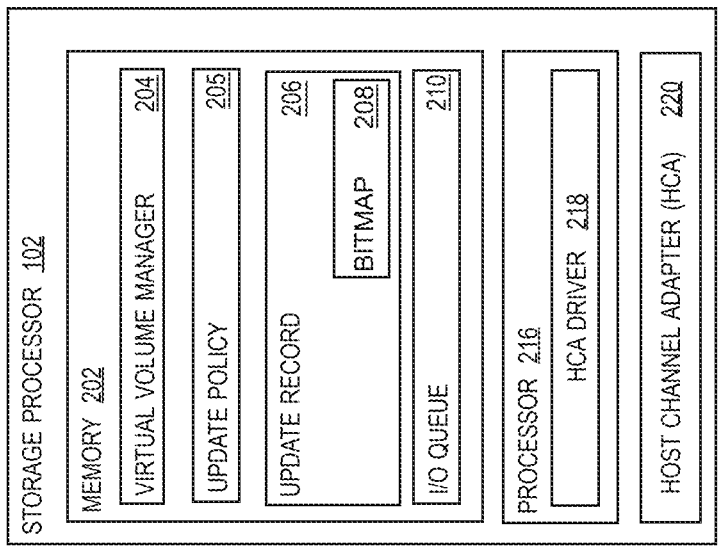
FIG. 2 is a diagram of an example of a storage processor, according to one or more aspects of the present disclosure.

FIG. 2 is a diagram of an example of a storage processor 102 of each one or a plurality of mirrored storage sites in a distributed storage system, according to aspects of the disclosure. As illustrated, the storage processor 102 may include a memory 202, a processor 216, and a host channel adapter (HCA) 220. According to the present example, the HCA 220 may be an NVIDIA ConnectX-6 ™ HCA. The processor 216 may include any suitable type of processing circuitry, such as one or more of a general-purpose processor (e.g., an x86 processor, a MIPS processor, an ARM processor, etc.), a special-purpose processor, an application-specific integrated circuit (ASIC), a field programmable gate array (FPGA), etc. The memory 202 may include any suitable type of volatile and/or non-volatile memory, such as a solid-state drive (SSD), a hard disk (HD), a random-access memory (RAM), a Synchronous Dynamic Random-Access Memory (SDRAM), etc. The HCA 220 may be a circuit board or integrated circuit adapter that connects the storage processor 102 to the network 106 and the storage array 104 (shown in FIG. 1).

The memory 202 may include, be connected to, or otherwise access a virtual volume manager 204, an update policy 205, and update record 206 and an I/O queue 210. While each of the components are shown in FIG. 2 as a part of the memory 202, one skilled in the art will recognize that any of the components may be located outside of the memory 202 and in other components, circuitry or other structures accessible by the storage processor 102.

According to one aspect, as described herein, the storage processor 102 may be configured to process incoming I/O requests according to the update policy 205 when an inter-site link (i.e., a communications link between one or more mirror sites) breaks, fails, or is otherwise compromised. Incoming I/O requests may be processed to an I/O queue 210 in cache where the request will stored until it is destaged to a distributed memory.

According to one aspect, memory 202 may be configured with a virtual volume manager 204. The virtual volume manager 204 may be configured to process requests, including I/O requests, according to the update policy 205 and update record 206, as described herein. According to one aspect, the virtual volume manager 204 may use the update policy 205 to establish consistent I/O operations and synchronized mirror sites before, during and after a potential link or communications disruption between the sites. According to one aspect, the update record 206 may include a bitmap 208 configured to track individual memory blocks of the mirrored site and whether those blocks change during an I/O request or operation. According to one aspect, as more fully described below, each bit in the bitmap track one block of storage, and if that bit is set for one site's bitmap, then that site has changed that block without being able to update the other site. When the link between the sites is restored and the sites resume normal communication, the sites may exchange information from the update record 206 and bitmap 208 to synchronize the sites and return to a fully-mirrored state.

The processor 216 may execute an HCA driver 218 for the HCA 220. The driver may be configured to, at least in part, manage the I/O queue 210 as well as any other queues that are used by the storage processor 102 for the transmission of data via the HCA.

Figure 3:
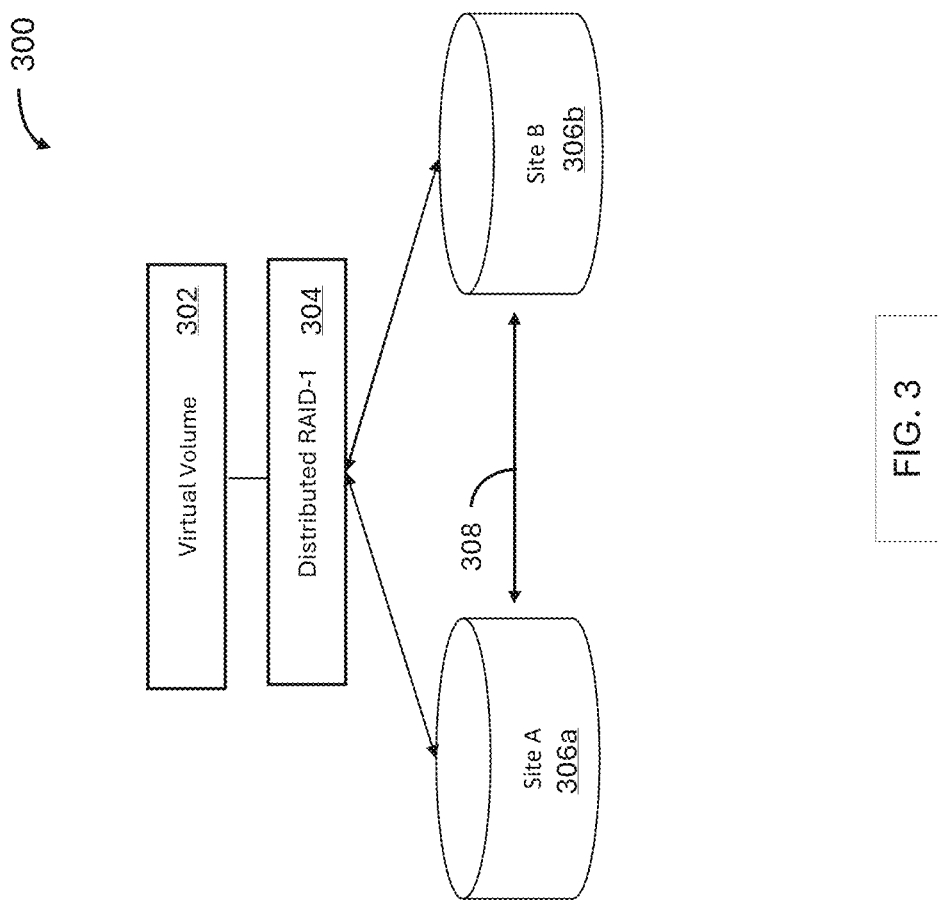
FIG. 3 is a block diagram of distributed storage system with a virtual volume and two mirrored storage sites, according to one or more aspects of the present disclosure.

FIG. 3 is a block diagram of distributed storage system 300 with a virtual volume 302 and two mirrored storage sites, 306a, 306b, according to one or more aspects of the present disclosure. The virtual volume 302 may be implemented in a RAID-1 304 configuration. Accordingly, a first storage site 306a (Site A) and a second storage site 306b (Site B) may be mirrors of each other. As such, if an I/O request is processed by the virtual volume 302 and directed to the first storage site 306a, that operation may be mirrored to the second site 306b. According to one aspect, a communications link 308 may connect the first site 306a and the second site 306b for the purpose of updating each other during and after I/O operations to maintain the mirrored state between the storage sites 306a, 306b.

If the link 308 breaks, fails or is otherwise compromised, however, there is no mechanism for updating the respective storage sites to any I/O operations or changes in memory. In such cases, if I/O operations were to continue using both sites, the integrity of the data in the storage sites may not be maintained with each site having inconsistent data (e.g., a non-mirrored state). To avoid the inconsistency, typical storage systems may halt or suspend all I/O operations altogether until the link is restored and normal operations can continue. Doing so, however, is insufficient and results in unwanted downtime.

According to one aspect, distributed storage systems described herein may, upon detecting a failed link between two sites, detach one or more of the mirrored storage sites and suspend I/O operations on those sites. To do so, one or more of the sites may be designated as a primary site that is allowed to carry on with normal I/O operations while the link is down.

According to one aspect, a particular site may be automatically designated as a primary site through static rules; for example, Site A 306a may always become a primary site. Alternatively, the designation of a primary site may be accomplished automatically according to dynamic rules; for example, if one site is active and the other is passive, the active site may become the primary site. Alternatively, the designation may be made by a manual procedure; for example, a system administrator is tasked with assigning a primary site upon detection of the broken link.

According to one aspect, normal I/O operations may continue on the primary site, while I/O operations are suspended on all non-primary sites. While the designated primary site continues I/O operations in the absence of the non-primary sites, the primary site may be making changes that cannot be reflected on the non-primary site's copy of the memory. When the sites come back in touch, rather than copy all blocks from the primary site's mirror to the non-primary site's mirror, which may be inefficient and time consuming copying blocks that haven't been changed, an update record may be used to determine which individual memory blocks need to be updated.

According to one aspect, a bitmap that tracks individual blocks may be provided or generated at each site. For example, each bit in the bitmap may track one block of storage, and if a bit is set for one site's bitmap, then that site has changed that block without being able to update the other site. When the link between the sites is restored and the sites resume communication, the sites may exchange information about their state, including for example, whether the site became primary site, and whether there are bits set in their respective bitmaps. According to one aspect, in a system where only one site became the primary site and continued I/O operations while the link was down, the primary site's blocks may be considered to be up the most up-to-date, and the non-primary site may need to receive updates based on the contents of the bitmaps at the primary site.

According to one aspect, to make the mirrored sites consistent again, the primary site may push the updated blocks in the primary site's bitmap to the corresponding blocks of the non-primary site, while the non-primary site pulls blocks from the primary site that are marked in the non-primary site's bitmap. According to one aspect, this process of fixing the differences in a distributed storage array, like a RAID-1, using the bitmap may be referred to herein as a "rebuild."

Figure 4:
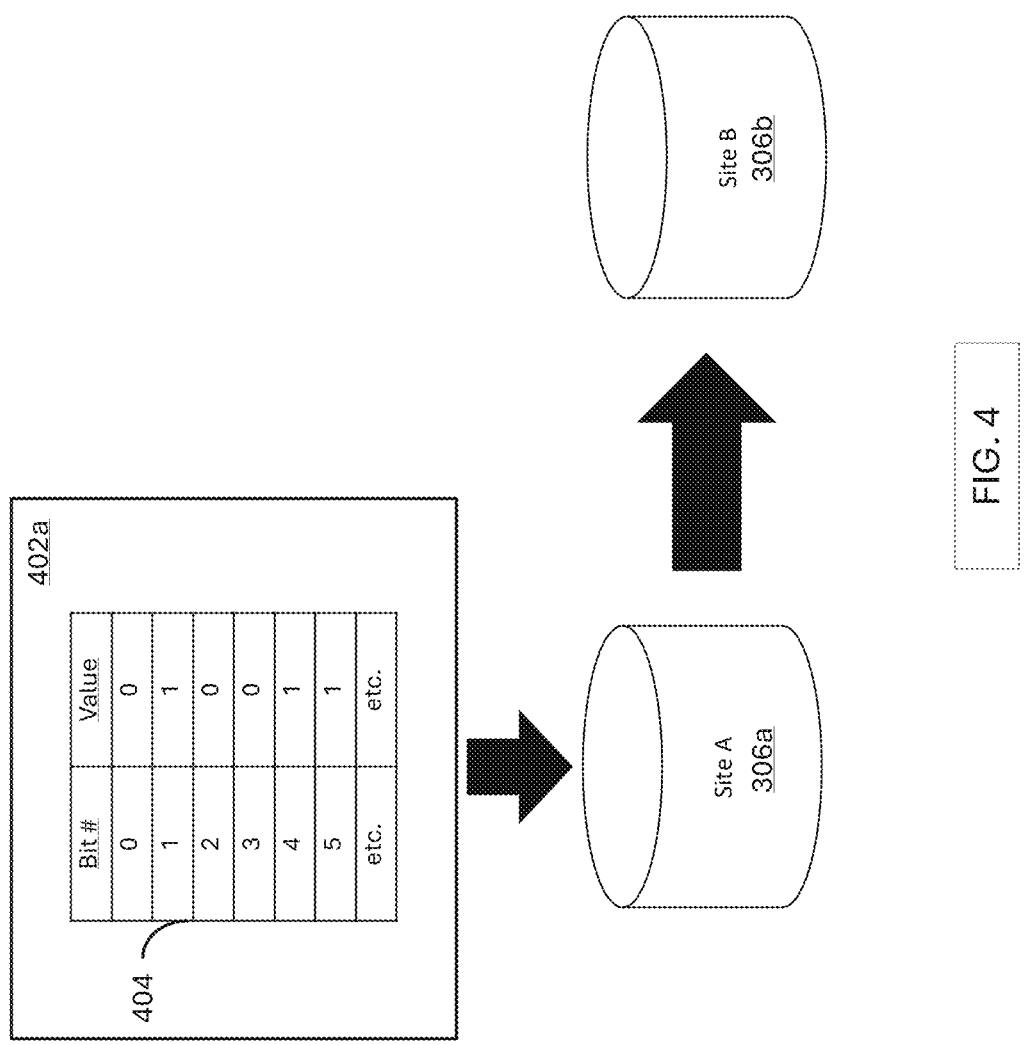
FIG. 4 is a block diagram of an example update record and bitmap used by mirrored storage sites according to one or more aspects of the present disclosure.

FIG. 4 is a block diagram of an example update record 402a and bitmap 404 used by mirrored storage sites according to one or more aspects of the present disclosure. The update record 402a may include a site status indicator (not shown) reflecting the site's status during a link outage (e.g., whether the site became a primary or non-primary site). The update record 402a may further include a bitmap 404 tracking the individual memory blocks of the site. As shown in FIG. 4, for example, the update record 402a provided on Site A 306a may contain the bitmap 404 including a write status indicator indicating which memory blocks have undergone a change during I/O operations carried out while the link between Site A 306a and Site B 306b was down (i.e., when Site B was detached).

As can be determined from the bitmap 404, for example, blocks '1', '4', and '5' may have been changed during continued I/O operations when Site A and Site B were isolated. According to one aspect, when the link is restored, the distributed storage system may rebuild the sites to a mirrored state by consulting and comparing the bitmaps of the sites. In the example of FIG. 4, blocks '1', '4', and '5' may be copied from Site A 306a to Site B 306b to return the two sites to a fully mirrored state.

According to one aspect, while the rebuild is occurring, the distributed storage system may receive read and write I/O requests from hosts to the virtual volume at both sites, Site A 306a and Site B 306b. The non-primary site (e.g., Site B 306b), however, may not be used for reads, since it is unknown which blocks on the non-primary site's memory are up-to-date. Rather than configure the primary site to consult its bitmap to determine this, which would add overhead to the host's read request, the non-primary site may be configured to forward I/O reads by the hosts to the primary site until the rebuild is complete.

According to one or more aspects, in some circumstances, it may be possible for both sites, Site A 306a and Site B 306b to simultaneously become primary sites. For example, there may be an automatic rule to make Site A 306a the primary, however, an administrator or other operator at the location of Site B 306b may deem it critical to have access to the data on Site B 306b as well and chooses to manually detach Site A 306a, effectively making Site A 306a and Site B 306b both primary sites at the same time. Accordingly, because the broken link prevents communication between Site A 306a and Site B 306b, both sites may be continuing I/O operations in conflict with each other as one site is not aware of the others status as co-primary sites. In such a situation, when the sites come back into communication, each site may detect this situation, for example, by consulting the site status indicator, and realize that a conflicting detach scenario has occurred. Each site may have changed any particular block in different ways, so I/O operations cannot continue as normal and still guarantee data consistency.

According to one aspect, the distributed storage system may resolve this problem by keeping the sites logically separate, even though they are physically connected again by the repaired link. In a logically separated state, one site may send I/O writes to the other site and continue to mark bits in each bitmap. To exit a state of conflicted detach, an administrator may be allowed to declare one site the "conflicting detach primary". The conflicting detach primary may start pushing the blocks marked in its bitmap to the other site, while the other site uses its bitmap to determine blocks that need to be pulled from the conflicting detach winner site. According to one aspect, a more fine-grained approach may allow the administrator to surgically declare the conflicting detach winner on a per-block, per-object, or per-file basis, although such an approach may carry additional complications, including the administrator having to know which site, and which memory clusters may have the most up-to-date blocks, then having to input such information into the system.

According to another aspect of the disclosure, a given site may be required to be up-to-date to be considered for designation as a primary site. A site may be considered fully or partially out-of-date if the site awaits the completion of a rebuild in order to make its local mirror of the distributed storage up-to-date. For example, a site may become out of date if a link between the sites fails during a rebuild operation. If the out-of-date site were allowed to become a primary site and continue on with I/O operations, then that site would be accessing an old version of the data. This can be allowed, however, with the manual override and explicit acknowledgement of the administrator.

One skilled in the art will recognize that while the examples and aspects of the distributed storage system described above may include two nodes, aspects of the present disclosure include systems and methods for allowing continual I/O operations for any number of mirrored storage sites. As detailed below, the concepts, techniques and methodologies described herein may be expanded or scaled to additional mirrored sites. For the purposes of clarity and brevity, the systems described herein may include two-site or three-cite systems, but systems with additional sites are within the scope of the present disclosure.

Figure 5:
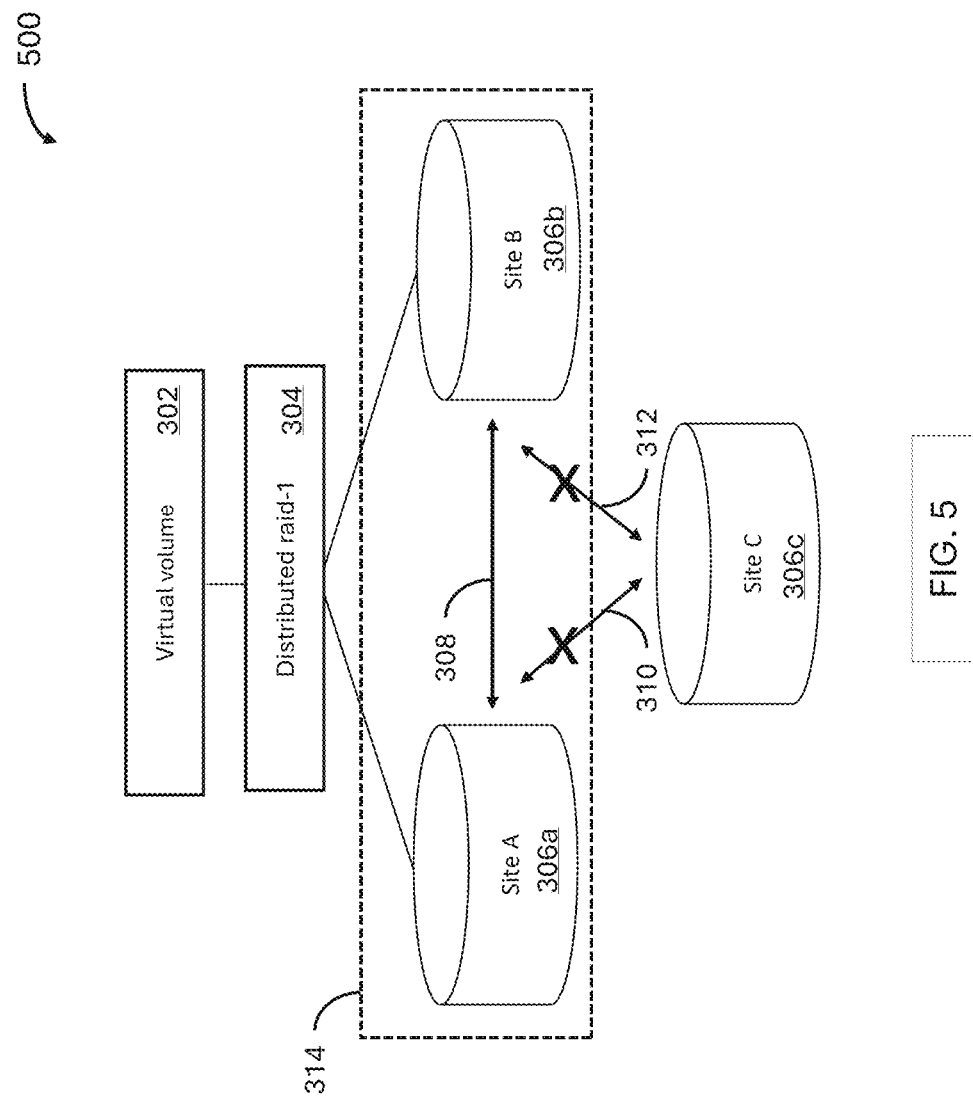
FIG. 5 is a block diagram of a distributed storage system with a virtual volume and three mirrored storage sites, according to one or more aspects of the present disclosure.

FIG. 5 is a block diagram of a distributed storage system 500 according to one or more aspects of the disclosure. Similarly to the system shown in FIG. 3, where like reference numerals represent corresponding components, the system 500 may include a virtual volume 302 arranged in a RAID-1 array 304 with three mirrored storage sites: Site A 306a, Site b 306b and Site C 306c. According to one or more aspects of the present disclosure, the system 500 may operate substantially similar to the system 300 shown in FIG. 3 during normal I/O operations. The system 500, however, may include a third mirrored site 306c. Each of the mirrored sites may be interconnected by communications links, including a first link 308 between Site A 306a and Site B 306b, a second link 310 between Site A 306a and Site C 306c, and a third link between Site B 306b and Site C 306c. During normal I/O operations, the first link 308, second link 310 and third link 312 may be configured to communicate and update the respective mirrored sites according to incoming I/O requests from the virtual volume 302.

According to aspects of the present disclosure, in systems having more than two distributed sites, when one of the links interconnecting two nodes fails, the system 500 may form an "island" of sites whose links are still operational. As used herein, the term "island" may refer to a subset of storage sites who remain interconnected and in communication when one or more other sites are detached due to a compromised or failing link. An island may be considered a primary site, as described herein, to continue I/O operations.

According to one aspect, all missing sites (i.e., sites to which one or more communications links are down) may be detached from the island before I/O operations can continue. The isolated site may be detached using methods described above. In addition, a majority rule policy may be implemented, where if, for instance, any one site in a three (or more) site system becomes disconnected, the remaining still-connected sites can automatically continue I/O operations. That is, an island of sites that has a strict majority of the number of sites in the system may automatically be made the primary site.

In the example system 500 of FIG. 5, Site C 306c may become isolated due to one or more of the second link 310 and/or third link 312 failing. Accordingly, the system 500 may detach Site C 306c and form an island 314 with Site A 306a and Site B 306b as the first link 308 remains operational allowing those nodes to communicate. Site A 306a and Site B 306b may continue with normal I/O operations and maintain a mirrored state as I/O requests are stored in their respective memories. According to one aspect, if only one of the second link 310 or the third link 312 go down, the system may either continue by forwarding all writes to the site still in communication, or the system may force a state of isolation by disabling the still-in-communication link down.

Figure 6:
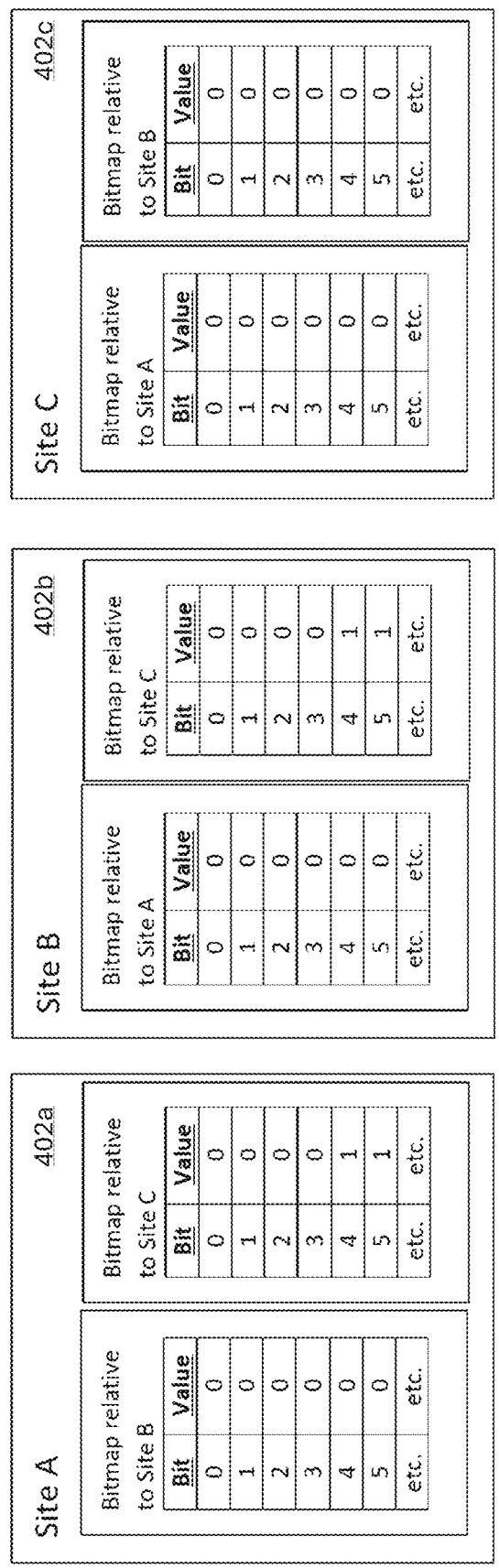
FIG. 6 is a diagram of update records of the three mirrored storage site system of FIG. 5, according to one or more aspects of the present disclosure.

According to one aspect, the bitmaps stored and maintained on each site may allow for the tracking of I/O operations on the island 314 such that when the second link 310 and third link 312 are restored, Site C 306c may be rebuilt and return to a fully mirrored state. FIG. 6 shows the update records and bitmaps of the three mirrored storage sites of FIG. 5, according to one or more aspects of the present disclosure. Each update record, referred to generally as update records 402, may include separate bitmaps for tracking I/O requests relative to every other site. For example, in a three-site system, each update record 402 may include two separate bitmaps for tracking memory block changes relative to the other sites. Accordingly, Site A may include an update record 402a with one bitmap tracking memory block changes relative to Site B and another bitmap for tracking memory block changes relative to Site C. Site B and Site C will also include update records 402b, 402c, respectively, each with two bitmaps tracking memory block changes relative to the other sites. According to one aspect, the bitmaps are not shared between the sites. A site may update its bitmap upon successful completion of an I/O request to its local memory, as described herein, when that site is aware of the detachment of another site, or it learns that an I/O request failed on another site.

According to one aspect, the use of the bitmaps in the update records 402 may be optimized to avoid introducing cross-site latency on I/O operations. For example, as shown in FIG. 5, with Site C 306c detached due to one or both of the second link 310 and the third link 312 failing, Site A 306a and Site B 306b may form the island 314. The island 314 may continue to operate normally as a collective primary site. Because, however, the island sites are aware of a missing or detached third site, both Site A and Site B begin to track I/O requests processed in their respective update records 402 and bitmaps. As shown in the update records 402 of FIG. 6, for example, if Site A receives an I/O request for blocks (i.e., bits) '4' and '5', upon successfully writing blocks '4' and '5' to their local memories, Site A and Site B may each mark bits '4' and '5' in the bitmaps of their respective update records (e.g., update record 402a on Site A and update record 402b on Site B) relative to Site C. According to one aspect, the write status indictor or "Value" for each of blocks '4' and '5' may be set to a binary value of '1' to indicate that block has changed. A value of '0', therefore, is indicative of an unchanged memory block. As shown in the update record 402c for Site C, all values for the blocks on that site are '0' because it cannot or has not been updated due to its detached state.

According to one aspect, when the links to Site C are restored, the update records 402 may be compared to determine which memory blocks on Site C need to be updated to return Site C to a fully mirrored state. Site C may be rebuilt according to the concepts, techniques and methodologies described above.

According to one aspect, despite all communication links remaining up and operational, an I/O request may still fail on any one of the sites. Similar steps may be taken to update the site experiencing the failed operation. For example, an I/O request may be received from a host on Site A, however, the request may fail on Site C. Accordingly, the bitmaps at Site A and Site B relative to Site C need to be updated, as described above. Site A may have to inform Site B to update its bitmap, since the request was received to Site A and Site B may not know that the write failed at Site C.

According to aspects of the present disclosure, the above described concepts, techniques and methodologies may be adapted for systems with any number of mirrored sites. Over time, however, certain complications may arise as multiple nodes go in and out of communication with each other. The distributed storage system may face complicated scenarios in determining which sites are up-to-date and in a fully mirrored state and which ones are in need of updates. Tracking the most up-to-date site presents certain challenges when the site interconnections can change due to arbitrary link outages and their subsequent restorations. Take for example, a three site system, as described above, in which Site C becomes isolated and therefore detached. Site A and Site B may continue normal I/O operations as described above. If, however, Site A and Site B become isolated from each other, one site must be designated as a primary. If Site 2 is designated as a primary, that site will be the only site carrying out I/O operations. If Site 2 and Site 3 are rejoined by a reestablished link, Site 2 may know which blocks have been updated in the absence of site 3. Those may include I/O requests initiated at Site 2, and the I/O requests that were initiated at Site 1 when before it was detached. As detailed above, the I/O requests may trigger updates to Site 2's bitmap relative to the isolated Site 3. Therefore, Site 2 can use its bitmap to rebuild and update Site 3. At that time, I/O operations can continue on the island containing sites 2 and 3.

Complications may arise, for example, if Site B and Site C then become isolated, Site B becomes a primary site again, and subsequently Site A and Site C rejoin. In such a situation, it must be determined whether Sites A and C can become an island and continue I/O operations or they are in a conflicted detach state and thus need to be logically separated until their conflicts can be resolved.

According to one aspect, a solution to resolve data differences among multiple sites when they rejoin may use a primary version indicator. A "primary version indicator", as used herein, may include a value, kept on a per-site basis for each virtual volume, that tracks when a site begins making changes to its memory in the absence of one or more other sites. That is, the primary version indicator may indicate the number of times a site has become a primary site. The primary versions indicators may be compared to determine whether a given site's memory reflects changes made to another site's memory. The primary version indicator may be exchanged between sites as part of the update record and/or when the sites are rejoined by an operational link.

FIG. 7 is a flow diagram of a distributed storage update operation 700, according to one or more aspects of the present disclosure, in which primary version indicators may determine how to update and maintain mirrored states. According to one aspect, as will be more clearly explained below in connection with the exemplary flow diagram of FIG. 7, a primary version indicator may be incremented by one when a particular site is designated as a primary site and non-primary sites may adopt the primary version indicator from a primary site after contacting the primary site and completing a rebuild from that primary site's bitmap. As shown in FIG. 7 a bolded primary version indicator is one that has been incremented or updated from a previous state.

According to one aspect, the update operation may begin, as shown in block 702 with all sites, for example Sites A, B, and C, all in communication with established links. The three nodes are all synchronized and in a fully mirrored state for normal I/O operations. In such a state, as shown in table 722 each site includes a primary version indicator of '1' stored in each site's respective update records. As shown in block 704, Site C may become isolated due to a failed or broken link between Site C and one or more of Sites A and B. As shown in block 706, and described herein, Sites A and B may be designated as an island and continue I/O operations. Accordingly, as shown in table 724, the primary version indicator for Sites A and B are incremented by one to '2' in the update records stored on each respective site.

At block 708, Sites A and B may become isolated. According to predefined rules or a manual designation, Site B may become the primary site, shown in block 710. As can be seen in table 726, the primary version indicator on Site B is incremented to '3'.

At block 712, Site C may rejoin Site B. Table 728 indicates that the primary version for Site C stored on both Site B and Site C is incremented to '2'. According to one aspect, these primary version indicators can be incremented as Site C is allowed to receive I/O requests immediately. As shown in block 714, Site B may rebuild Site C from its bitmap and Site C may adopt the primary version indicators for other sites, shown in table 730. That is the primary version indicator on Site C relative to Site B is updated from '1' to '3' and the primary version indicator on Site C relative to Site A is incremented from '1' to '2'.

At block 716, Sites B and C may become an island and continue I/O operations. At block 718, Sites B and C may isolate and Site C detaches Site B to become the primary site. At this point all three sites are isolated. As shown in Table 732, the primary version indicator on Site C is updated and incremented to '3' to reflect Site C as the primary site.

At block 720, Sites A and C may rejoin. As both sites have detached each other since they were last in communication, both Site A and Site C may consult their update records and primary version indicators to determine if one or the other may be designated as the primary. In considering whether Site C has all of the updates from Site A, a comparison of the primary version indicators for Site A stored on Site A and Site C shows are both '2'. Therefore, the Site C memory reflects all of the changes made by Site A since they were last in touch.

Conversely, when considering whether Site A has all of the updates on Site C, a comparison of the primary version indicators stored on Site C for Site C is '3', while the primary version indicator stored on Site A for Site C is only '1'. This indicates that Site C's memory includes changes that are not reflected on Site A's memory. Accordingly, Site A and Site C have differences in their respective memories, however those differences are not conflicting. Therefore, Site C can be designated as the primary and can rebuild Site A using Site C's bitmap. Site A and C can then resume I/O operations as an island.

According to another aspect, FIG. 7A depicts a distributed storage update operation 700' in which a conflicting detach occurs. The operation 700' is substantially similar in many aspects to the operation 700 of FIG. 7, where like reference numerals reflect corresponding blocks and tables. Accordingly, blocks 702-708 and tables 72 and 724 are the same for operation 700'. At block 710' however, Sites A and B may separate and both Site A and Site B may be designated as primary sites (i.e., Site A detaches Site B, and Site B detaches Site A) without the other site knowing. This represents a conflicting detach. Accordingly, as shown in table 726', the primary version indicator stored on Site A for itself is incremented from '2' to '3' and the primary version indicator stored on site B for itself is incremented from '2' to '3' also.

At block 712' Site B may rejoin with Site C Table 728' indicates that the primary version for Site C and both Site B and Site C is incremented to '2'. According to one aspect, these primary version indicators can be incremented as Site C is allowed to receive I/O requests immediately. As shown in block 714', Site B may rebuild Site C from its bitmap and Site C may adopt the primary version indicators for other sites, shown in table 730'. That is the primary version indicator on Site C relative to Site B is updated from '1' to '3' and the primary version indicator on Site C relative to Site A is incremented from '1' to '2'.

At block 716', Sites B and C may become an island and continue I/O operations. At block 718', Sites B and C may isolate and Site C detached Site B to become the primary site. At this point all three sites are isolated. As shown in Table 732', the primary version indicator on Site C is updated and incremented to '3' to reflect Site C as the primary site.

At block 720', Sites A and C may rejoin. As both sites have detached each other since they were last in communication, both Site A and Site C may consult their update records and primary version indicators to determine if one or the other may be designated as the primary. In considering whether Site C has all of the updates from Site A, a comparison of the primary version indicators for Site A stored on Site A and Site C shows Site A has a higher version for itself ('3') than site C has for Site A ('2'). This may indicate that the Site C memory is missing some of the changes made by Site A since they were last in communication.

Conversely, in considering whether Site A has all of the updates from Site C, a comparison of the primary version indicators for Site C stored on Site A and Site C shows the primary version indicate stored on site C for itself is '3' while the primary version indicator stored on Site A for Site C is only '1'. This may indicate that Site A's memory is missing some of the changes made on Site C. Accordingly, Site A and C are in a conflicting detach scenario and cannot be rejoined and may be logically separated, as described herein, until an administrator or other operator of process can resolve the conflicting data.

While the examples given herein may be described in connection with two or three site systems, one skilled in the art will recognize that any number of sites may be implemented. According to aspects of the present disclosure, no additional logic may be necessary to scale support systems with distributed RAID-1 arrays spanning four or more sites. As detailed herein, missing or isolated sites may be detached before I/O operations are allowed to resume on a set of connected primary sites. Each site may still maintain its primary version indicator for itself while tracking the values for all other sites involved in the distributed RAID-1 array. When sites come back into touch, comparisons to the primary site determine whether sites are in conflict, or if clear primary sites and non-primary sites can be determined.

According to one aspect, the concepts, techniques and methodologies described herein may rely on sites observing other sites becoming disconnected. While these disconnections may be described in terms of network disconnects, one skilled in the art will recognize that the same disconnects may be observed in other failure cases, such as site failures (e.g., power loss or permanent site loss). As such, the concepts, techniques and methodologies described herein may include solutions covering site failure cases also.

According to aspect described herein, storage systems are described that may offer distributed access to storage across three or more sites, including when one or more communication links connecting the sites are down, allowing links to come and go arbitrarily. Systems and methods described herein provide for systems with three or more sites in which any island of still-connected sites can perform consistent I/O together, detach rules (automated and manual) can be applied to islands of still-connected sites, and I/O operations are enabled in multiple combinations of cross-site network failures and/or site failures in any sequence, including enabling multi-way per-island detach and conflicting detach.

According to aspects of the present disclosure, for a system with N sites, the number of possible unique partitions of those sites into islands is given by the recursive Bell number, with the following equation, known in the art:

$$Bn + 1 = \sum_{k=0}^{n} \binom{n}{k} Bk.$$

The number of failures the system can handle may be even higher if site failures are counted as well as network partitions. The use of a primary version indicator allows the systems described herein to handle all island groupings and transitions between them. The number of failure sequences the system can handle may be equal to the number of transitions between island groupings. These can be counted by the number of permutations of two island groupings. For example, in the case of three sites, there are five island groupings (ABC, AB|C, A|BC, AC|B, A|B|C). There may be twenty 20 ways to transition from any one of these groupings to any other grouping.

In the example Table I below, the count of possible partitionings into islands is shown, and the count of transitions between them, given a number N of sites in a system:

TABLE I

| Count of sites (N) | Count of possible partitions ($B_n$) | Count of island partitioning transitions |
|---|---|---|
| 2 | 2 | 2 |
| 3 | 5 | 20 |
| 4 | 15 | 210 |
| 5 | 52 | 2652 |
| 6 | 203 | 41006 |
| 7 | 877 | 768252 |
| 8 | 4140 | 17135460 |

In systems with arbitrary number of sites, active/active distributed storage access may be enhanced with the concepts, techniques and methodologies described herein to keep I/O operations going at one or more sites when inter-site connectivity is disrupted, allowing business operations to continue in the face of challenging environmental conditions.

Further, while the systems and methods described herein may be described in terms of block storage, one of skill in the art will recognize that the same may be implemented in terms of object or file systems (e.g., substitute blocks with objects or files in concepts described above), without deviating from the scope of the disclosure.

Figure 8:
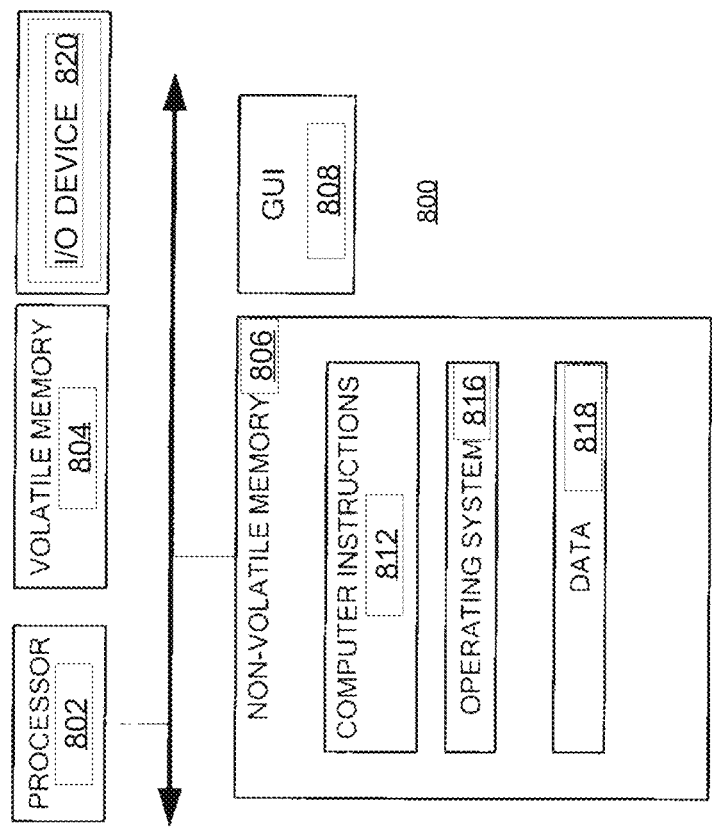
FIG. 8 is a diagram of an example of a computing device, according to one or more aspects of the present disclosure.

Referring to FIG. 8, in some embodiments, a computing device 800 may include processor 802, volatile memory 804 (e.g., RAM), non-volatile memory 806 (e.g., a hard disk drive, a solid-state drive such as a flash drive, a hybrid magnetic and solid-state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 808 or received from I/O device 820.

FIGS. 1-8 are provided as an example only. In some aspects or embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term "vector" refers to a sequence of numbers (and/or other elements). The phrase "the element having index i" refers to the i-th element in the sequence. For example, if i=1, the phrase i-th element in the sequence would refer to the first element in the sequence, if i=2, the phrase i-th element in the sequence would refer to the second element in the sequence, and so forth.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method comprising:
providing a storage system having a plurality of storage sites, the storage system configured to receive input/output (I/O) requests from a host;
providing an update record for each of the plurality of storage sites;
detecting a failure in a link between at least two of the plurality of storage sites;
designating at least one of the plurality of storage sites as a primary site;
receiving a first I/O request to the storage system;
directing the first I/O request to the primary site;
updating the update record on the primary site to reflect the I/O request; and
rebuilding the plurality of storage sites based on the update record upon restoration of the link.

2. The method of claim 1 further comprising suspending the I/O requests to all non-primary sites.

3. The method of claim 1 wherein each update record includes a site status indicator comprising one of a primary site indicator or a non-primary site indicator.

4. The method of claim 1 wherein each update record comprises a bitmap relative to each other storage site including a list of storage blocks and a write status indicator for each storage block.

5. The method of claim 4 wherein the write status indicator includes a binary value indicating whether a corresponding storage block has been changed.

6. The method of claim 5 wherein rebuilding the plurality of storage sites comprises updating storage blocks of non-primary sites corresponding to a positive write status indicator in the bitmap of the primary site.

7. The method of claim 1 further comprising forwarding a second I/O request to the primary site while rebuilding the plurality of storage sites.

8. The method of claim 1 wherein the primary site is designated by at least one of: an automatic static rule, an automatic dynamic rule, or a manual designation.

9. The method of claim 1 wherein the primary site comprises an island of sites undisturbed by the failure in the link.

10. The method of claim 9 wherein each update record comprises a separate bitmap relative to each of the plurality of storage sites.

11. The method of claim 10 wherein each update record further includes a primary version indicator, the primary version indicator reflecting a number of times designated as a primary site.

12. The method of claim 11 wherein the primary version indicator is augmented upon rebuilding with a primary site.

13. The method of claim 12 wherein the primary version indicator determines designation of the at least one of the plurality of storage sites as the primary site.

14. The method of claim 12 wherein the primary version indicator determines a logical separation between one or more of the plurality of storage sites.

15. A system comprising:
a memory; and
at least one processor that is operatively coupled to the memory, the at least one processor being configured to perform the operations of:
providing a storage system having a plurality of storage sites, the storage system configured to receive input/output (I/O) requests from a host;
generating an update record for each of the plurality of storage sites;
detecting a failure in a link between at least two of the plurality of storage sites;
designating at least one of the plurality of storage sites as a primary site;
receiving a first I/O request to the storage system;
directing the first I/O request to the primary site;

updating the update record on the primary site to reflect the I/O request; and rebuilding the plurality of storage sites based on the update record upon restoration of the link.

16. The system of claim 15 wherein each update record comprises a bitmap relative to each other storage site including a list of storage blocks and a write status indicator for each storage block, wherein the write status indicator includes a binary value indicating whether a corresponding storage block has been changed.

17. The system of claim 16 wherein rebuilding the plurality of storage sites comprises updating storage blocks of non-primary sites corresponding to a positive write status indicator in the bitmap of the primary site.

18. The system of claim 15 further comprising forwarding a second I/O request to the primary site while rebuilding the plurality of storage sites.

19. The system of claim 15 wherein the primary site comprises an island of sites undisturbed by the failure in the link, and further wherein each update record comprises a separate bitmap relative to each of the plurality of storage sites and a primary version indicator reflecting a number of times designated as a primary site, wherein the primary version indicator is augmented upon rebuilding with a primary site.

20. A non-transitory computer-readable medium storing one or more processor-executable instructions, which when executed by at least one processor cause the at least one processor to perform the operations of:

providing a storage system having a plurality of storage sites, the storage system configured to receive input/output (I/O) requests from a host;

generating an update record for each of the plurality of storage sites;

detecting a failure in a link between at least two of the plurality of storage sites;

designating at least one of the plurality of storage sites as a primary site;

receiving a first I/O request to the storage system;

directing the first I/O request to the primary site;

updating the update record on the primary site to reflect the I/O request; and rebuilding the plurality of storage sites based on the update record upon restoration of the link.

* * * * *